United States Patent [19]

King

[11] 4,329,942

[45] May 18, 1982

[54] ANIMAL RESTRAINT DEVICE

[76] Inventor: Willis T. King, 5137 Boonville Hwy., Evansville, Ind. 47715

[21] Appl. No.: 235,047

[22] Filed: Feb. 17, 1981

[51] Int. Cl.³ .................... A01K 29/00; A01K 15/04
[52] U.S. Cl. .................................................. 119/96
[58] Field of Search .......................... 119/96, 101, 103

[56] References Cited

U.S. PATENT DOCUMENTS

| | | | |
|---|---|---|---|
| 764,876 | 7/1904 | Alexander | 119/101 |
| 1,685,435 | 9/1928 | Philbrick | 119/96 |
| 2,026,383 | 12/1935 | Gyulay | 119/96 |
| 2,826,172 | 3/1958 | Buckle et al. | 119/96 |

*Primary Examiner*—Robert Peshock
*Assistant Examiner*—Robert P. Swiatek
*Attorney, Agent, or Firm*—John F. Booth; Gerald G. Crutsinger; Monty L. Ross

[57] ABSTRACT

An animal restraint device adapted to be worn by the animal comprising a pair of stave like members held in place along the sides of the animal by harness members attached to both staves towards the ends of the staves and a pair of pull members each attached to one of the staves in the vicinity of said harness members and adapted to be removably affixed to the other stave member, the harness members and the pull members passing partially around the animal's body in opposite directions when the restraining device is in place; the restraining device may have ring members for connecting the front of each stave to a collar around the animal's neck and a ring member at the back of each stave for connecting an additional restraining element.

6 Claims, 3 Drawing Figures

ANIMAL RESTRAINT DEVICE

BACKGROUND INFORMATION

This invention relates to animal restraint devices and more particularly to a device for restricting or restraining animals from certain movements or actions while at the same time allowing the animal essentially full freedom in other movements and actions.

It is often desirable to restrict the movements of an animal in various ways in order to perform certain acts on the animal such as grooming, clipping, medical treatment or merely examination without undue danger to the person performing the act or undue discomfort or injury to the animal. In other instances, it is desirable to prevent an animal from reaching certain parts of his body with his mouth or paws so that he will be unable to aggravate, infect or otherwise adversely affect wounds, sores or surgical sites or to remove dressings or bandages by licking, biting, or scratching actions.

Prior Art Restraints of this type are exemplified by U.S. Pat. Nos. 2,815,525 to Hoagland, 2,941,507 to Becker et al, 2,998,008 to Klesa, 3,013,530 to Zeman, and 4,036,179 to Turner et al. The Hoagland and Becker et al devices are designed primarily for use with horses and attempt only to restrict head movements of the animal. The Klesa device is for the purpose of restraining individual arms and/or legs of human patients through attachment of the device directly to the arm or leg.

Zeman provides a large dish like shield member with a central opening which fits over the animal's head and is attached by a flexible means to a collar around the animal's neck. The animal is restrained from getting his mouth on other parts of his body, but it will experience difficulty and discomfort in normal functions of eating, sleeping or even lying down; it may also cause discomfort from the "dish" effect of concentrating normal sound waves into the animal's sensitive ears.

The Turner et al device comprises a padded, flexible, single piece member which wraps around the animal's forequarters and along his sides about shoulder high. The device is of sufficient thickness to prevent the animal from reaching his chest or belly areas or his rear extremities with his head. Nevertheless, the bulk of the device may prevent the animal from reclining or sleeping comfortably.

Neither the Zeman nor the Turner et al devices offer restraining action for other purposes such as examination or treatment of the animal.

SUMMARY OF THE INVENTION

It is one object of the present invention to provide a restraint device to be worn by an animal for restraining certain of the animal's movements while not interfering with or causing discomfort to the animal in other activities.

It is a further object to provide a restraint device for animals to prevent their irritating or infecting wounds or surgical sites through mouth or paw contact.

It is a further object to provide an animal restraint device also useful in restraining an animal's movements for purposes of treatment, grooming, or examination.

An additional object is to provide a device useful in animal training and other purposes.

For the accomplishment of these and other objects, the present invention features a pair of light weight staves which are harnessed to the animal positioned one along each side about shoulder high and extending from just forward of the animal's shoulder to just behind his hip. The staves are of a relatively thin material designed to flex to some degree, but not bend. Each stave is provided with a set of anchor and support eyes a short distance from each end as well as a control or accessory opening or eye near each end. When in place, the device inhibits lateral flexing of the animal's spine.

BRIEF DESCRIPTION OF THE FIGURES OF THE DRAWINGS

The invention is described in connection with the attached drawings wherein.

DETAILED DESCRIPTION OF THE PREFERRED EMBODIMENTS

Figure 1:
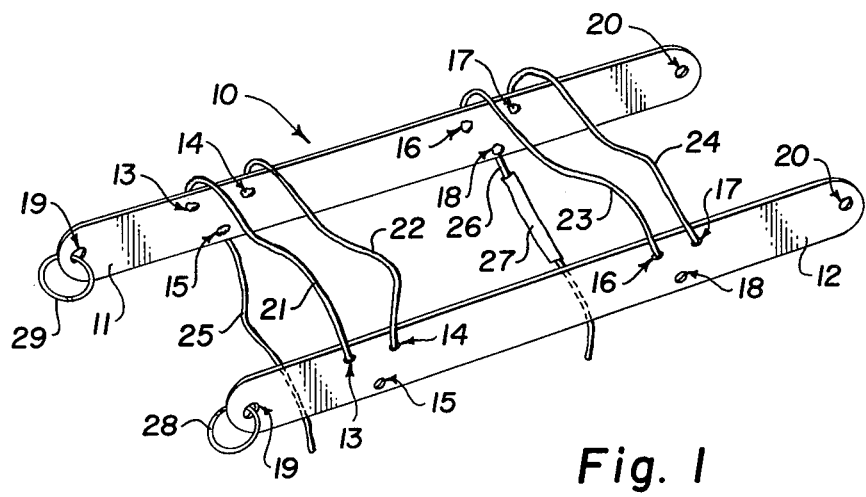
FIG. 1 is a perspective view of the animal restraint device invention including a pair of stave members and harness members.

As best shown in FIG. 1, the restraint device 10 of the present invention comprises a pair of staves 11 and 12 which are of a relatively thin plastic or other material of suitable strength such that the staves may flex but cannot be bent or broken by the animal. "Lexan" plastic material by General Electric Company has been found suitable. Each of the staves is provided with openings at 13, 14, and 15 about one-quarter to one-third of its length from the end, and openings at 16, 17 and 18 about one-quarter to one-third of its length from the other end. Each stave is also provided with an opening at 19 and 20 near each end of the stave. Each stave is shaped to eliminate sharp edges, points or corners which might injure or be painful to the animal. A pair of front harness members 21 and 22 of leather or webbed fabric strap, nylon rope or similar material are connected between the staves 11 and 12 by means of the openings at 13 and 14 respectively. A pair of rear harness members 23 and 24 of like construction are connected between the staves 11 and 12 by means of the openings 16 and 17. The attachment of these harness members should be such as to prevent bulges or irritating projections on the stave surface worn next to the animal. For example, holes 13, 14, 16 and 17 may be counter sunk from the inner surface to allow use of a knotted robe end as a means for attaching the harness member to the stave.

Figure 2:
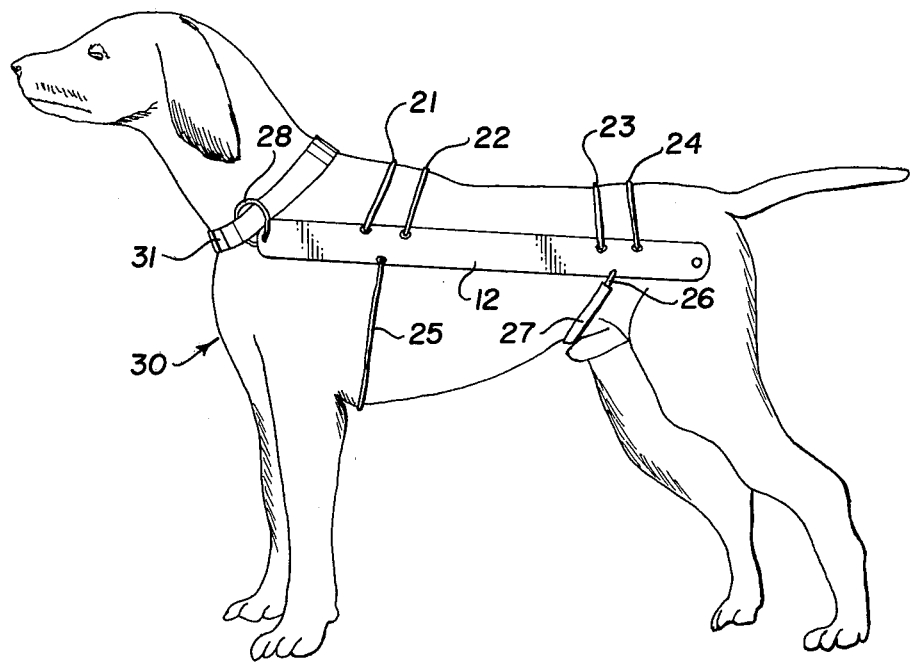
FIG. 2 illustrates the placement of the present invention in use on an animal.

Front and rear pull members 25 and 26 have one of their ends anchored to the openings at 15 and 18 respectively on one stave and their other ends adapted to slip through the openings at 15 and 18 respectively on the other stave, and to be anchored as by tying or knotting. The pull members may be of the same material as the harness members. A flexible plastic tubing element 27 optionally may be placed over the rear pull member 26 to avoid urine absorption and staining of the pull member. Split rings 28 and 29 may be attached to the staves to the front openings at 19. In use, the restraint device 10 should be size selected to fit the particular animal 30. As shown in FIG. 2, each stave 11 or 12 should be of such length as to span from just in front of the animal's shoulder to just behind its hip. The harness members 21, 22, 23 and 24 should be of such length as to hold the staves at about shoulder height on the animal. From FIG. 2 it can be seen that the restraint device is applied to the animal with each of the harness members 21–24 across the animal's back holding a stave on either side of the animal. Pull member 25 is brought under the animal's chest just behind his forelegs and fastened to the other stave much in the manner of a saddle cinch. Pull member 26 with its tubing 27, if used, is brought under the animal's belly and affixed to the opposite stave in a similar manner except, of course, pull 26 cannot be drawn as tight because of the lack of bone structure in the animal at this point. The restraint device may be further secured by passing a collar 31 around the animal's neck and through the rings 28 and 29.

When wearing the restraint device of the present invention, it is virtually impossible for the animal to perform movements requiring more than minimal lateral flexing of its spine in order to reach many parts of his body with his mouth or paws.

Figure 3:
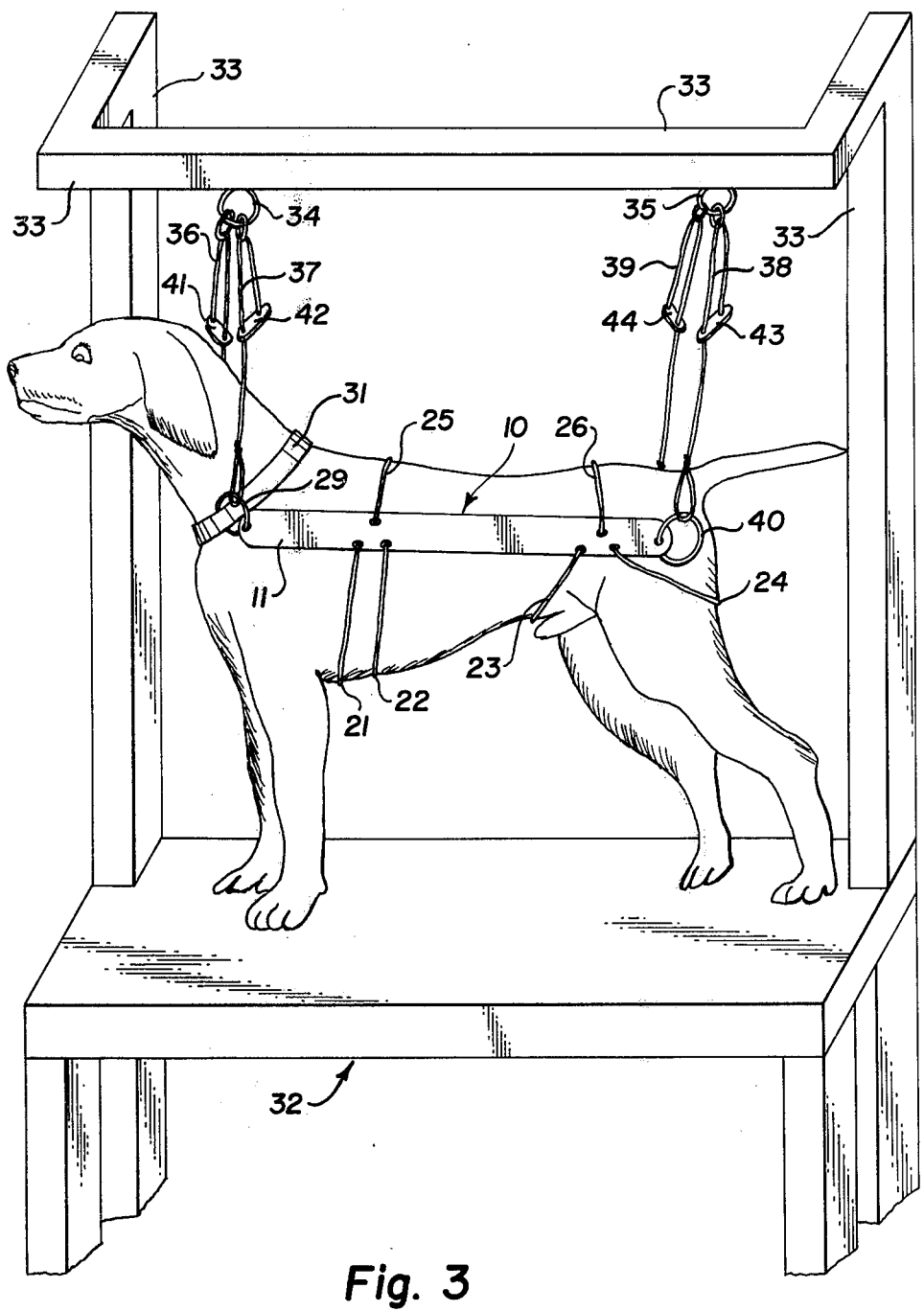
FIG. 3 illustrates use of the present invention in restraining an animal on a grooming, treatment or examination table.

FIG. 3 illustrates use of the animal restraint device in the present invention in holding an animal for examination, medical treatment or perhaps grooming. As shown in FIG. 3, the restraint device is preferably placed on the animal in a slightly different way. The double harnesses 21, 22, and 23 are arranged to pass under the animal's chest and belly as illustrated. Harness 24 passes behind the animal's back legs to better prevent backward motion of the animal. Pull members 25 and 26 pass over the animal's back and are secured to stave 12 not visible. Obviously, this is merely exactly the same restraint device 10 shown in FIG. 2 which has been turned over when applied to the animal for a slightly different purpose. Although the restraint device will function well with the application shown in FIG. 3 even when applied to the animal as shown in FIG. 2, the application shown in FIG. 3 is preferred for reasons which will be obvious from the following.

For examination or treatment purposes, the animal is to be held on a table 32. A framework 33 attached to the table, or if desirable to a wall or other structure, holds anchor means such as rings 34 and 35 above the area where it desired to hold the animal. With the restraint device in place, the animal is placed on table 32 and restraining elements 36, 37, 38 and 39 are connected from the anchor rings 34 to the rings 28 and 29 at the front of staves 11 and 12 and between anchor ring 35 and the rings which have been added to the rear end of stave 11 and 12, only one of the added rings, 40, being shown. The restraining elements may take the form of nylon ropes with spring clips at one end for easy attachment to the rings of the restraint device. The other end may be looped through one of the anchor rings 34 or 35 and terminate in a length adjustment device such as the snubbing blocks 41–44. For best restraint of the animal, the length of the restraining elements 36 and 37 should be so adjusted that the animal's forelegs are just off, or almost off, the table top. It is for this purpose that the restraint device has been applied to the animal with the harness members 21 and 22 passing under the animal's chest. In the use illustrated here, it may also be preferable that the harness members 21 and 22 take the form of relatively wide straps rather than of ropes.

While preferred embodiments of the invention have been illustrated and described, it should be understood that many changes and variations will be apparent to those skilled in the art which are still within the principles taught herein.

The invention having been described, what is claimed is:

1. An animal restraint device adapted to be worn by the animal comprising: a pair of relatively thin, narrow staves of sufficient strength to withstand forces exerted by the animal without bending or breaking, said staves being of a length to reach from just forward of the animal's shoulder to the vicinity of its hip; at least one harness member attached between said staves at a distance of about one-quarter to one-third of the stave length from one end; at least one additional harness member attached between said staves at a distance of about one-quarter to one-third of the stave length from the other end; a pair of pull members, each attached to one of said stave members in the vicinity of one of said harness members and adapted to be removably affixed to the other stave member in a vicinity of said one of said harness members and means for attaching the forward end of each of said staves to a neck collar worn by said animal whereby lateral spine flexing in said animal is restrained by said device when placed on an animal with the staves positioned along opposite sides of said animal, the forward ends of such staves attached to a neck collar on the animal, the pull members connected between the staves across and partially encircling the animal's body and the harness members completing the encirclement of the animal's body.

2. The animal restraint device of claim 1 further comprising a length of flexible plastic tubing surrounding a substantial length of the rear one of said pull members.

3. The animal restraint device of claim 1 wherein each of said at least one harness members comprises a pair of strap-like members.

4. The animal restraint device of any of claims 1–3 further comprising means at the rear end of each of said staves for attaching a restraining element.

5. The animal restraint device of claim 4 wherein said means for attaching the forward end of each stave and said means at the rear end of each stave are both ring elements.

6. The animal restraint device of any of claims 1–3 wherein said means for attaching is a ring element.

* * * * *

UNITED STATES PATENT AND TRADEMARK OFFICE
CERTIFICATE OF CORRECTION

PATENT NO. : 4,329,942
DATED : May 18, 1982
INVENTOR(S) : Willis T. King

It is certified that error appears in the above–identified patent and that said Letters Patent are hereby corrected as shown below:

In the Abstract, line 6, change "said" to -- the --.

Signed and Sealed this

Tenth Day of August 1982

[SEAL]

Attest:

GERALD J. MOSSINGHOFF

Attesting Officer     Commissioner of Patents and Trademarks